(12) United States Patent
Wu et al.

(10) Patent No.: US 7,451,121 B2
(45) Date of Patent: Nov. 11, 2008

(54) GENETIC ALGORITHM FOR MICROCODE COMPRESSION

(75) Inventors: Youfeng Wu, Palo Alto, CA (US); Mauricio Breternitz, Jr., Austin, TX (US)

(73) Assignee: Intel Corporation, Santa Clara, CA (US)

(*) Notice: Subject to any disclaimer, the term of this patent is extended or adjusted under 35 U.S.C. 154(b) by 473 days.

(21) Appl. No.: 11/237,562

(22) Filed: Sep. 27, 2005

(65) Prior Publication Data

US 2007/0094164 A1    Apr. 26, 2007

(51) Int. Cl.
*G06F 15/18* (2006.01)
*G06N 3/00* (2006.01)
*G06N 3/12* (2006.01)

(52) U.S. Cl. .......................................... 706/13; 706/12
(58) Field of Classification Search .................. 706/13, 706/14, 15, 16
See application file for complete search history.

(56) References Cited

U.S. PATENT DOCUMENTS 5,651,099 A * 7/1997 Konsella ...................... 706/13
6,539,532 B1 * 3/2003 Levi et al. ..................... 716/16
2003/0095151 A1 * 5/2003 Shackleford et al. ........ 345/833
2005/0114560 A1 * 5/2005 Coleman et al. ............. 710/22

OTHER PUBLICATIONS

U.S. Appl. No. 11/096,152, filed Mar. 31, 2005, Breternitz, Jr. et al.
U.S. Appl. No. 11/186,240, filed Jul. 20, 2005, Wu et al.
Merlo, G. et al., "Genetic-Algorithm Based Image Compression", Simposio Brasileiro de Automacao Inteligente, Sep. 1999.
Robie, David., "Correction to Genetic Algorithms and Applications to Data Compression", Georgia Institute of Technology, School of Electrical Engineering, Apr. 1996.

* cited by examiner

*Primary Examiner*—David Vincent
*Assistant Examiner*—Peter Coughlan
(74) *Attorney, Agent, or Firm*—Blakely, Sokoloff, Taylor & Zafman LLP

(57) ABSTRACT

A method to compress microcode utilizing a genetic algorithm includes generating a population of chromosomes, each chromosome including one or more elements that indicate a cluster to which a portion of microcode memory belongs. The method further includes determining a fitness value of each chromosome and modifying the population of chromosomes based on the fitness values of the chromosomes to generate a new population of chromosomes. In addition, the method includes compressing the microcode memory using a cluster-based compression technique, wherein clusters are selected according to a chromosome from the new population with the best fitness value. Other embodiments are also disclosed.

20 Claims, 5 Drawing Sheets

```
1   Initialize: generate P chromosomes;
2   Repeat for a number of time E:
3   {
4           Evaluate fitness of each chromosome of P and sort into upper half(P/2) with best
5                   fitness value and lower half (P/2) with worst fitness value;
6           Search and maintain hash table of evaluated chromosomes and fitness values;
7           Generate new generation of P chromosomes as follows:
8           {
9                   Keep chromosome with highest fitness value;
10                  Remove chromosome with worst fitness value and 1/3 other chromosomes
11                          from the remaining lower half chromosomes;
12                  Cross-over 40% of chromosomes from upper half by pairing the
13                          chromosomes to create new chromosomes;
14                  Mutate all chromosomes from upper half (except the best chromosome and
15                          resulting cross-over chromosomes) and the remaining lower half
16                          chromosomes by:
17                  {
18                          i = element of a chromosome;
19                          c[i] = gene to which an element belongs;
20                          K = number of genes;
21                          At each element i value c[i], change the value c[i] to {1,...,K} -
22                                  {c[i]} with a probability of 5% for upper chromosomes and
23                                  10% for lower chromosomes;
24                  }
25                  Replace any duplicated chromosomes with a random chromosome, where
26                          a duplicate is determined by referencing the hash table and the existing
27                          population of chromosomes, P;
28          }
29          If reached repetition #E, END, otherwise REPEAT;
30  }
31  Determine chromosome with best fitness value;
32  Select clusters based on the chromosome;
33  Compress microcode using the selected clusters;
    END;
```

FIG. 5

GENETIC ALGORITHM FOR MICROCODE COMPRESSION

FIELD OF THE INVENTION

The embodiments of the invention relate generally to microcode compression and, more specifically, relate to a genetic algorithm for microcode compression.

BACKGROUND

Many processors include one or more memories integrated into the processor core. Such memories include cache structures, which are typically formed of static random access memory (SRAM), as well as read only memories (ROMs) such as microcode storage. Microcode is the lowest-level instructions that directly control a microprocessor. A single machine-language instruction typically translates into several microcode instructions. Microcode operates by using the programmability of microarchitectural components to enhance functionality, and to apply updates to an existing design (e.g., a processor design). In such a manner, die area, power consumption, and design cost may be kept under control.

However, recent trends have migrated more advanced functionality to microcode of a processor core. Many processor designs include thousands of lines of microcode, and microcode storage can consume up to 20% of the die area of a processor. The cost for microcode storage is especially acute where small footprint dies and reduced power consumption are required, such as in processors used in embedded applications. Thus, any reduction in microcode size directly translates to reduced cost and power consumption in processors. A current technique for reducing microcode size includes compressing the microcode.

One basic idea for compressing microcode is to identify a set of unique bit patterns that compose the microcode word and store these in a table with a unique short ID for each pattern in the original microcode word sequence. An improvement of this basic idea is the clustering algorithm. The clustering algorithm splits each microcode word into a number of sub-words so that the number of unique patterns for each sub-word is minimized. The clustering algorithm accomplishes this by grouping similar columns of microcode storage into clusters, so that the total microcode storage size reduction is maximized.

A current approach to determine cluster groupings is through a K-means-based algorithm. The K-means algorithm uses a distance metric between pairs of columns to determine which cluster the columns should be assigned to. Although the K-means algorithm finds reasonably good reductions in microcode size, the distance between columns does not directly relate to microcode size reductions. In other words, a good cluster identified by the K-means algorithm ensures that the difference between columns in a cluster is small, but this does not necessarily mean that the redundancy between the rows is the highest for maximal microcode size reduction. Therefore, a new clustering algorithm that does not rely on the distance between pairs of columns to identify the best cluster for microcode size reduction would be beneficial.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

A method and apparatus to compress microcode utilizing a genetic algorithm are described. Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the following description, numerous details are set forth. It will be apparent, however, to one skilled in the art, that the embodiments of the invention may be practiced without these specific details. In other instances, well-known structures and devices are shown in block diagram form, rather than in detail, in order to avoid obscuring the invention.

Embodiments of the invention provide a genetic algorithm to compress microcode using a cluster-based approach. Genetic algorithms are a particular class of evolutionary algorithms that use techniques inspired by evolutionary biology such as inheritance, mutation, natural selection, and recombination (or crossover). In a population, those individuals better suited or more adaptable to the environment are most likely to survive, mate, and pass their genetic characteristics to their offspring. This process continues through the generations, and as the "fittest survive", the population moves towards individuals that are best suited to the environment.

The genetic algorithm works in the same fashion, a population is created, the fittest survive, and their "genetic" information is used to guide the search to better solutions. In computer simulations, genetic algorithms are typically implemented with a population of abstract representations (called chromosomes) of candidate solutions to an optimization problem. The candidate solutions gradually evolve toward better solutions.

As used in embodiments of the invention, a genetic algorithm is a class of algorithms that can identify the best clustering of microcode storage columns for a cluster-based compression technique by directly using an objective function to gradually improve microcode size reduction. In this case, the objective function is a formula representing the savings in microcode size resulting from the clustering. The genetic algorithm starts with an arbitrarily selected population of clusterings, and repeatedly mutates or evolves the existing population to obtain better populations with gradually better clusterings.

Figure 1:
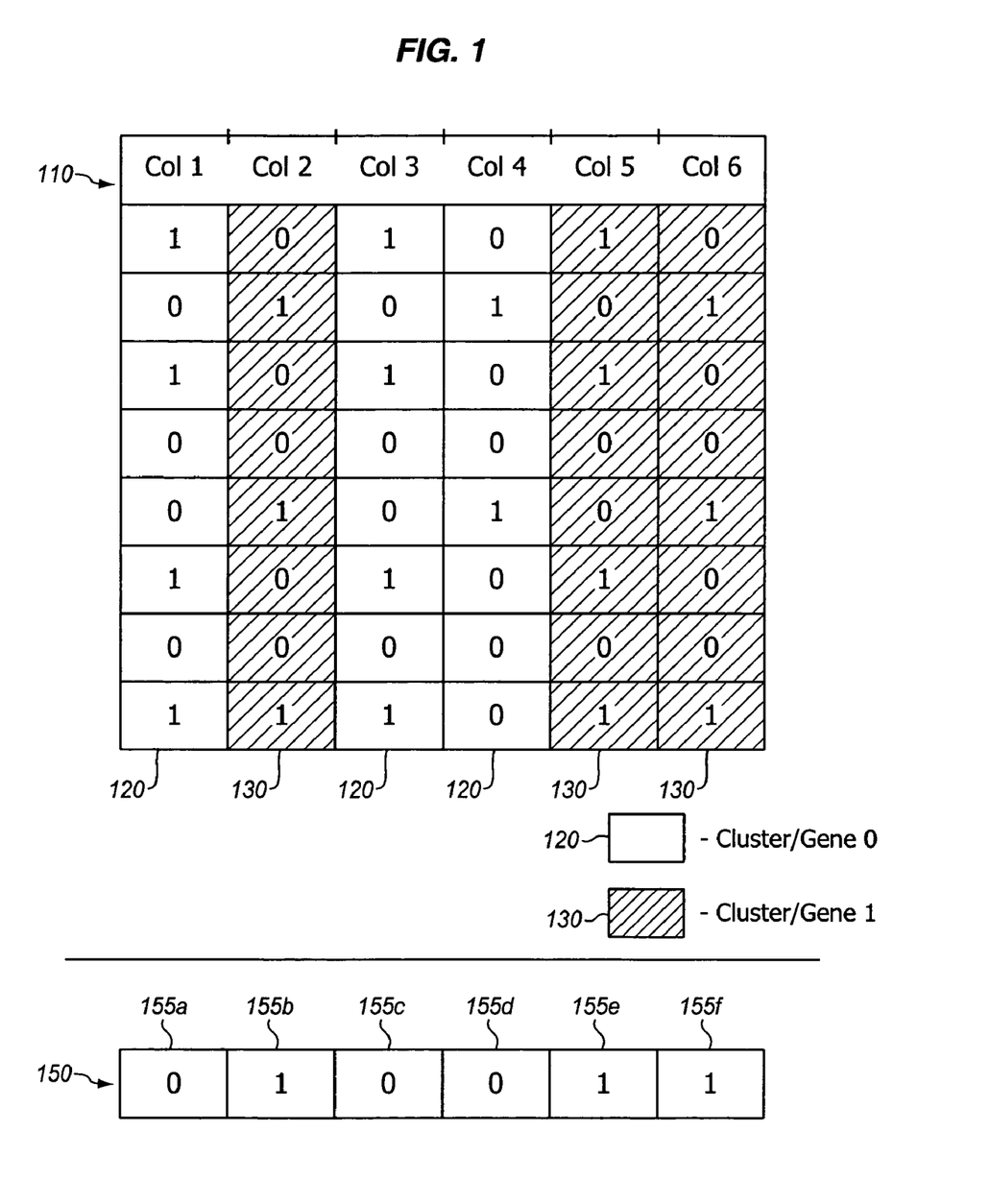
FIG. 1 illustrates a block diagram of one embodiment of microcode storage and a chromosome based on the microcode storage.

FIG. 1 illustrates a block diagram of one embodiment of microcode storage and a chromosome based on the microcode storage. In one embodiment, microcode storage 110 may be microcode read-only memory (UROM) storage located in a CPU. In some embodiments, microcode storage 110 is arranged in a column and row fashion. As illustrated, microcode storage 110 of FIG. 1 includes six columns. When compressing the microcode storage 110 with a cluster-based algorithm, the columns of microcode storage 110 may be clustered into different groups. For example, columns 1, 3, and 4 may be grouped into a first cluster 120, while columns 2, 5, and 6 may be grouped into a second cluster 130. The determination of which columns are assigned to which cluster varies according to the compression algorithm being implemented.

In one embodiment, a genetic algorithm may be utilized to determine an optimal assignment of columns to clusters for microcode storage compression. Initially, the genetic algorithm is defined by a list of parameters that are used to drive the optimization problem. The list of parameters called a chromosome. A population of chromosomes is created and tested to determine each chromosome's ability to solve the problem in accordance with some measure (e.g., an objective function). Those chromosomes with the highest fitness according to the objective function are selected and used to create the next generation of chromosomes through a selection and mutation process. In embodiments of the invention, each cluster 120, 130 of microcode storage is a gene in the genetic algorithm. For example, all of cluster 1 120 is gene 0, and all of cluster 2 130 is gene 1.

In one embodiment, a chromosome 150 is used as a parameter in the genetic algorithm for microcode compression. The number of columns in the microcode storage 110 corresponds to the length of the chromosome 150. Each chromosome includes a number of elements 155a-f. Each element 155a-f corresponds to a column in microcode, and the value of the element represents the gene (i.e., cluster) to which the column is assigned. As illustrated, element 155a corresponds to column 1 of microcode storage 110 and indicates that column 1 is assigned to gene 0. Element 155b corresponds to column 2 and represents that column 2 is assigned to gene 1. Elements 155c-f similarly show that each corresponding column is assigned to a particular gene.

In one embodiment, chromosomes may be represented as a simple string of data and instructions. However, a wide variety of other data structures for storing chromosomes may be implemented. Furthermore, in some embodiments, each element in a chromosome may be represented by the function $\log_2(K)$ bits, where K is the number of genes (i.e., clusters). More specifically, if K=2, then a bit-vector is sufficient to represent a chromosome.

Figure 2:
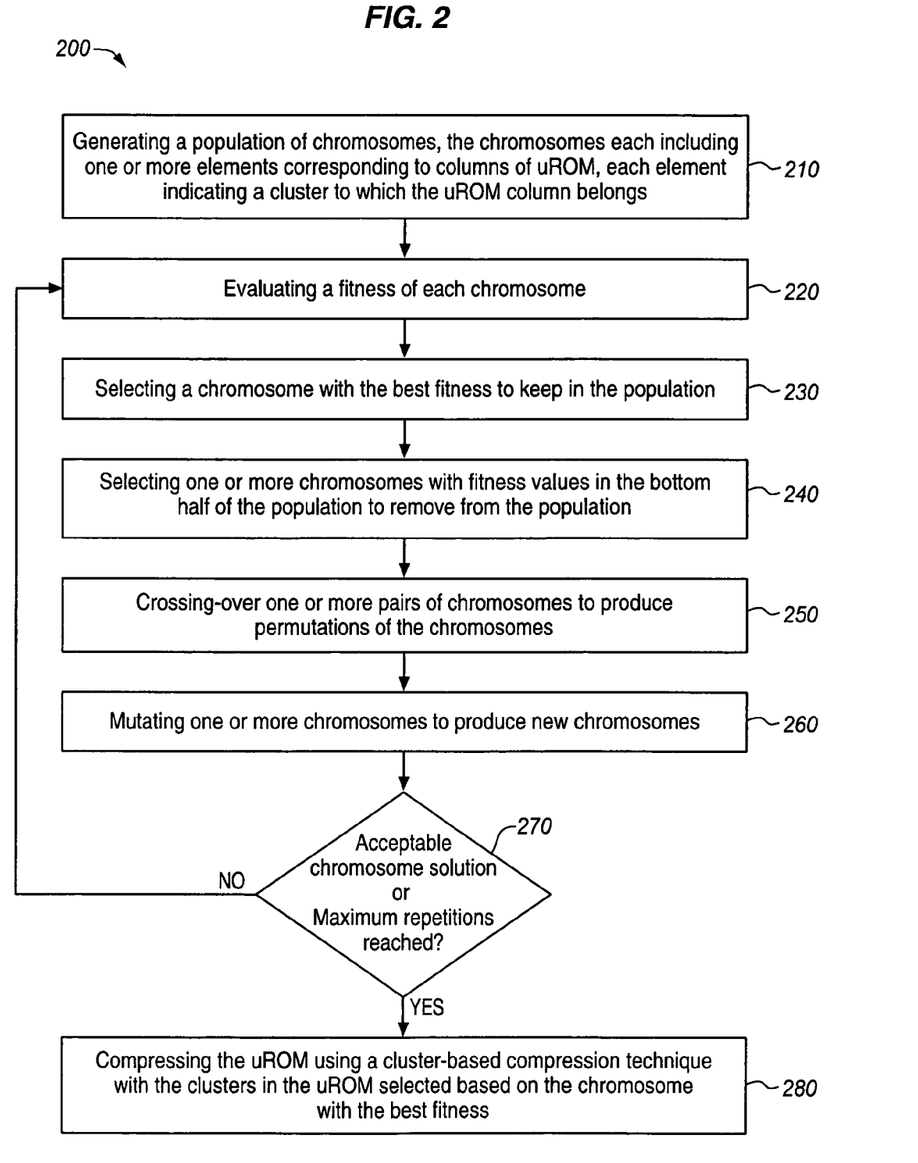
FIG. 2 is a flow diagram of a method of one embodiment of the invention.

FIG. 2 is a flow diagram of a method of one embodiment of the invention. In one embodiment, method 200 is a process for utilizing a genetic algorithm to determine the optimum clustering of columns for cluster-based microcode storage compression. In some embodiments, method 200 may be implemented in any programming language, converted to machine code by a compiler, and then executed on a computer system. Method 200 begins at processing block 210 where a population of chromosomes is generated with each chromosome including one or more elements corresponding to columns of microcode storage. Each element also indicates the gene to which the microcode storage column is assigned.

At processing block 220, a fitness of each chromosome is evaluated. In one embodiment, the fitness is determined according to an objective function that indicates the savings from the clustering represented by that chromosome. For example, the fitness, F, may be represented by the following formula:

$$F = L*N - \Sigma(i=1, K)[N(\log_2 M_i) + M_i * L_i], \text{ where}$$

L=number of columns in the microcode storage
N=the number of bits in each column
K=the number of genes (i.e., clusters) the L columns are clustered into L1, L2, . . . , Lk=the number of columns in each gene 1, 2, . . . , K
M1, M2, . . . , Mk=the number of unique patterns in genes 1, 2, . . . , K The above algorithm tries to find K clusters such that the fitness, F, is minimized.

Once the fitness value of each chromosome has been determined, the process continues at processing block 230, where the chromosome with the best fitness value in the population is selected to be kept in the population. At processing block 240, the chromosome with the worst fitness value, as well as one or more other random chromosomes with fitness values in the bottom half of the chromosomes, are removed from the population.

Then, at processing block 250, one or more pairs of the remaining chromosomes are crossed-over to produce permutations of the chromosomes. The term 'cross-over' refers to the operation of combining attributes of two different solutions to create a third solution. At processing block 260, the remaining chromosomes, not including the resultant crossover chromosomes, are each mutated to produce new chromosomes.

At decision block 270, it is determined whether an acceptable chromosome solution has been found or whether a maximum number of repetitions has been reached. If there is no acceptable solution or the number of maximum repetitions has not been reached at decision block 270, then the process returns to processing block 220. The process from processing blocks 220-270 is thereby repeated, where the resulting generation of chromosomes is evaluated and a new generation of chromosomes is created from the old generation.

On the other hand, at decision block 270 it may be determined that an acceptable solution has been reached or a maximum number of repetitions have occurred. In some embodiments, once a chromosome with a fitness equal to or exceeding a specific value has been found, further generations of chromosome populations may not need to be created. In other embodiments, the creation of new generations of chromosome populations may only be repeated for an established number of repetitions. In either case, at processing block 280, the microcode storage is compressed using a cluster-based compression technique where the clusters are selected based on the chromosome from the last created generation with the best fitness value.

Figure 3:
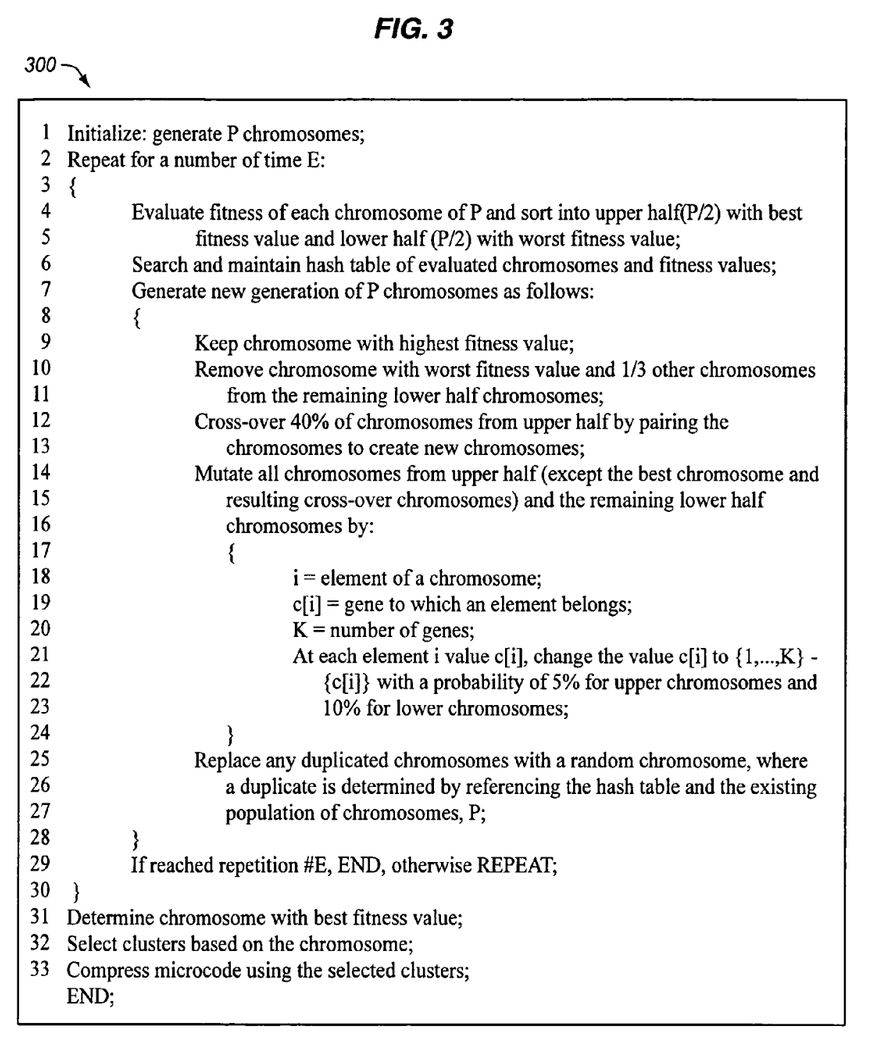
FIG. 3 is a pseudo-code listing implementing one embodiment of the invention.

FIG. 3 illustrates a pseudo-code listing to implement one embodiment of the invention. In one embodiment, pseudo-code listing 300 represents the software implementation of the genetic algorithm 200 described with respect to FIG. 2. In one embodiment, the pseudo-code listing may be implemented in any programming language and then converted to machine code by a compiler. In another embodiment, the pseudo-code listing may be performed by a firmware implementation.

Figure 4:
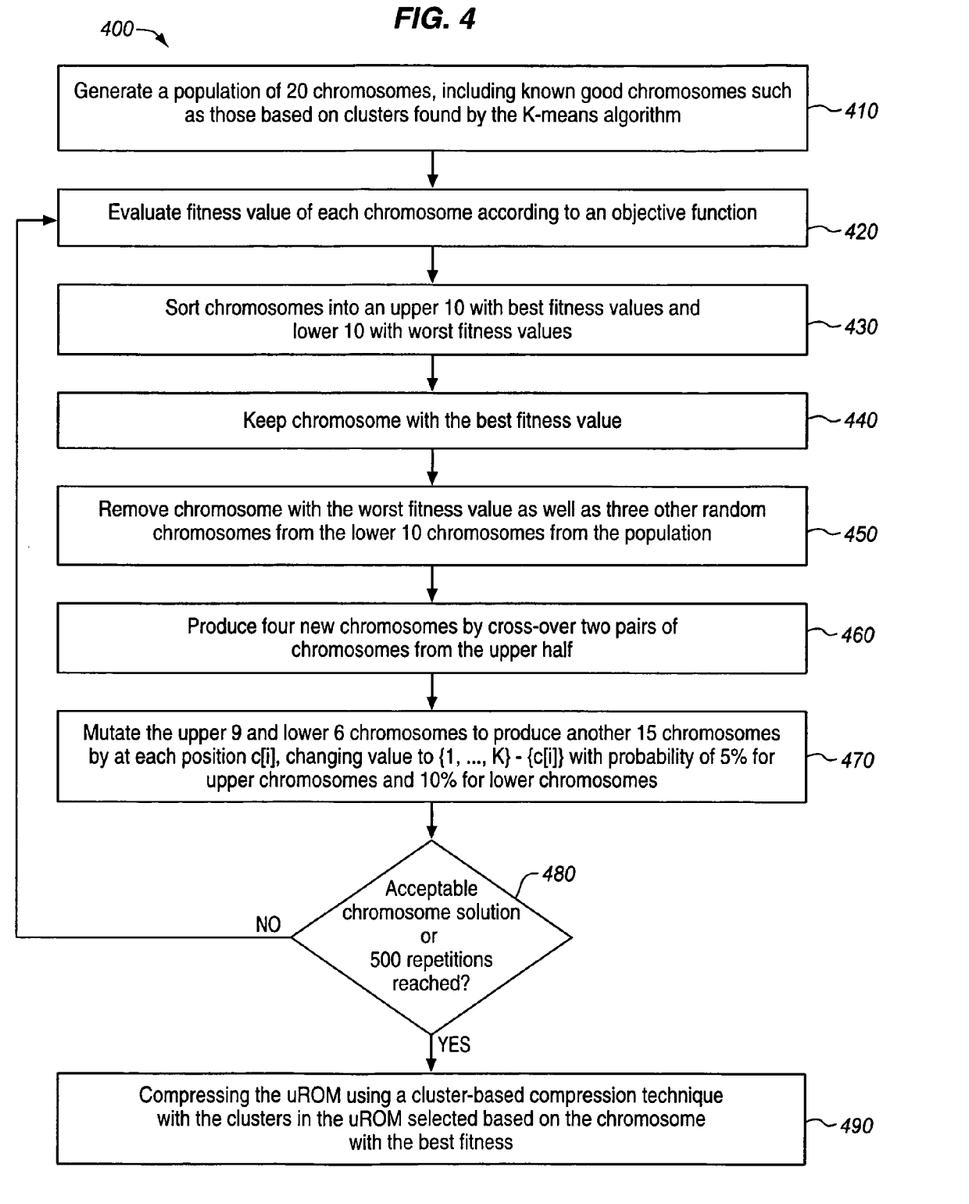
FIG. 4 is a flow diagram of a method of another embodiment of the invention.

FIG. 4 is a flow diagram of a method of another embodiment of the invention. Method 400 is a more specific implementation of the genetic algorithm 200 depicted in FIG. 2. Method 400 starts at processing block 410 where a population of twenty chromosomes is generated. The chromosomes correspond to the columns of a UROM in a CPU, with each element of the chromosomes indicating the cluster or gene to which the column belongs. In one embodiment, the population may include known good chromosomes, such as those based on clusters found by the K-means algorithm.

At processing block 420, the fitness value of each chromosome is evaluated according to an objective function, such as the formula to find fitness, F, described previously. Then, at processing block 430, the chromosomes are sorted into an upper 10 chromosomes with the best fitness values, and lower 10 chromosomes with the worst fitness values. At processing block 440, the chromosome with the best fitness value is selected to be retained in the next generation. At processing block 450, the chromosome with the worst fitness value, as well as three other random chromosomes in the lower 10 chromosomes, are removed from the next generation.

At processing block 460, four new chromosomes are created by crossing-over two pairs of chromosomes from the upper 10 chromosomes. Then, at processing block 470, the remaining upper 9 chromosomes (not included the recently crossed-over chromosomes) and the lower 6 chromosomes are mutated to produce another 15 chromosomes. This mutation is accomplished by changing the value $c[i]$ for each element i in a chromosome according to certain probabilities. The value $c[i]$ corresponds to the gene that is assigned to the column represented by element i. This value $c[i]$ is changed to $\{1, \ldots, K\} - \{c[i]\}$ with a probability of 5% for upper chromosomes, and 10% for lower chromosomes.

At decision block 480, it is determined whether an acceptable chromosome solution has been found or whether 500 repetitions have been reached. This is similar to decision block 270 of FIG. 2, and the respective discussion of that decision block also applies here. If no acceptable solution has been reached or less than 500 repetitions have occurred, the process returns to processing block 420 to repeat processing blocks 420-480 by evaluating the present chromosome population, and creating a new chromosome population based on the previous population.

If an acceptable solution has been reached or 500 repetitions have occurred, then, at processing block 490, the microcode storage is compressed using a cluster-based compression technique where the clusters are selected based on the chromosome from the last created generation with the best fitness value.

Figure 5:
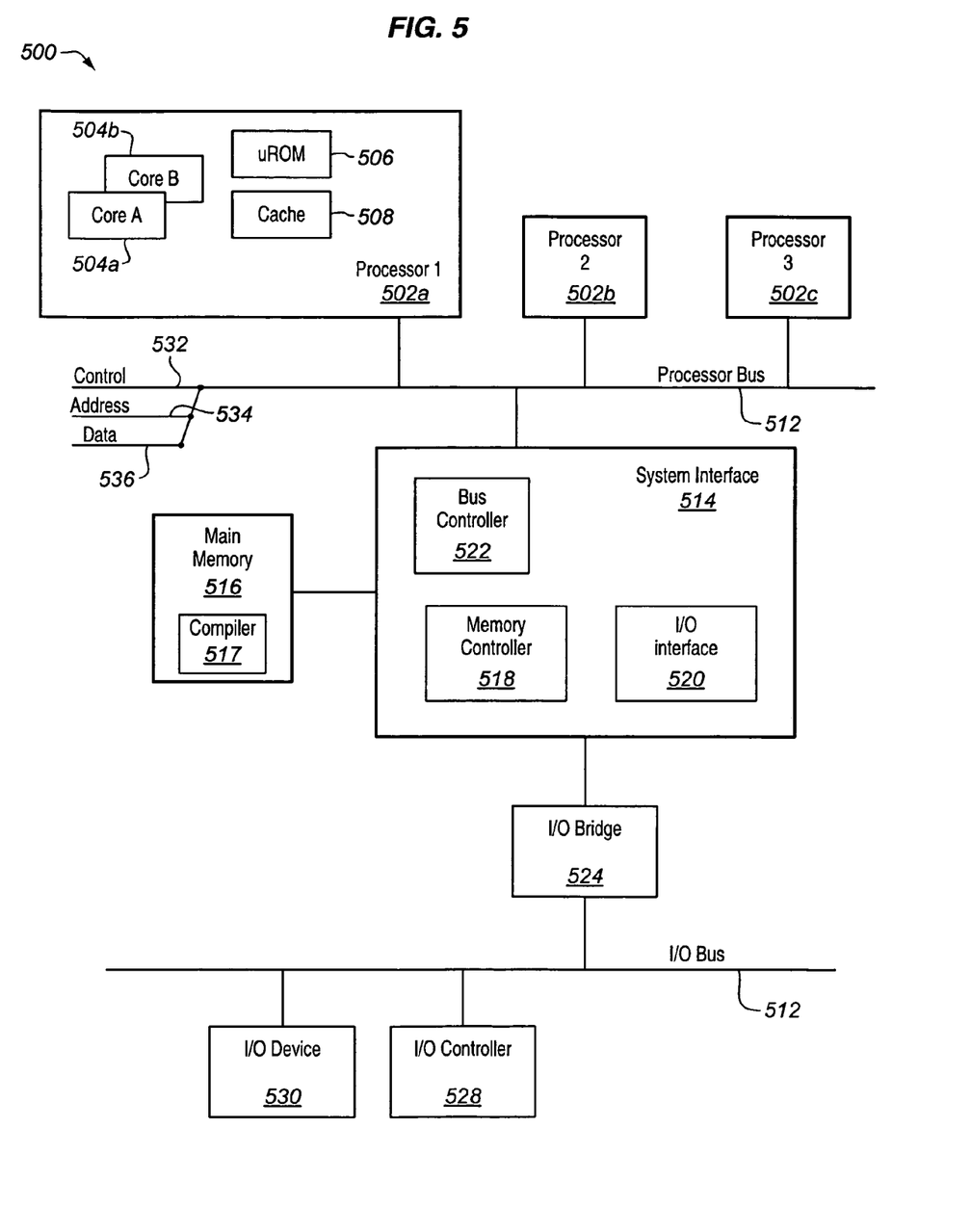
FIG. 5 illustrates a block diagram of an exemplary computer system used in implementing one or more embodiments of the invention.

FIG. 5 is a block diagram illustrating an exemplary computer system 500 used in implementing one or more embodiments of the invention. The computer system (system) 500 includes one or more processors 502a-c. The processors 502a-c may include one or more single-threaded or multi-threaded processors. A typical multi-threaded processor may include multiple threads or logical processors, and may be capable of processing multiple instruction sequences concurrently using its multiple threads.

Processors 502a-c may also include one or more internal levels of cache 508 and a bus controller or bus interface unit to direct interaction with the processor bus 512. As in the case of chip multiprocessors or multi-core processors, processors 502a-c may be on the same chip. The chip may include shared caches, interprocessor connection network and special hardware support such as those for SPT execution (not shown). Furthermore, processors 502a-c may be multicore processors, including first and second processor cores 504a, 504b. Additionally, processors 502a-c may include a corresponding UROM 506 in accordance with embodiments of the invention.

Processor bus 512, also known as the host bus or the front side bus, may be used to couple the processors 502a-c with the system interface 514. Processor bus 512 may include a control bus 532, an address bus 534, and a data bus 536. The control bus 532, the address bus 534, and the data bus 536 may be multi-drop bi-directional buses, e.g., connected to three or more bus agents, as opposed to a point-to-point bus, which may be connected only between two bus agents.

System interface 514 (or chipset) may be connected to the processor bus 512 to interface other components of the system 500 with the processor bus 512. For example, system interface 814 may include a memory controller 518 for interfacing a main memory 516 with the processor bus 512. The main memory 516 typically includes one or more memory cards and a control circuit (not shown). System interface 514 may also include an input/output (I/O) interface 520 to interface one or more I/O bridges or I/O devices with the processor bus 512. For example, as illustrated, the I/O interface 520 may interface an I/O bridge 524 with the processor bus 512. I/O bridge 524 may operate as a bus bridge to interface between the system interface 514 and an I/O bus 526. One or more I/O controllers and/or I/O devices may be connected with the I/O bus 526, such as I/O controller 528 and I/O device 530, as illustrated. I/O bus 526 may include a peripheral component interconnect (PCI) bus or other type of I/O bus.

System 500 may include a dynamic storage device, referred to as main memory 516, or a random access memory (RAM) or other devices coupled to the processor bus 512 for storing information and instructions to be executed by the processors 502a-c. Main memory 516 may also be used for storing temporary variables or other intermediate information during execution of instructions by the processors 502a-c. In some embodiments, main memory 516 may include instructions to execute a compiler 517. Compiler 517 may operate to assist in the implementation of various embodiments of the present invention. System 500 may include a read only memory (ROM) and/or other static storage device coupled to the processor bus 512 for storing static information and instructions for the processors 502a-c.

Main memory 516 or dynamic storage device may include a magnetic disk or an optical disc for storing information and instructions. I/O device 530 may include a display device (not shown), such as a cathode ray tube (CRT) or liquid crystal display (LCD), for displaying information to an end user. For example, graphical and/or textual indications of installation status, time remaining in the trial period, and other information may be presented to the prospective purchaser on the display device. I/O device 530 may also include an input device (not shown), such as an alphanumeric input device, including alphanumeric and other keys for communicating information and/or command selections to the processors 502a-c. Another type of user input device includes cursor control, such as a mouse, a trackball, or cursor direction keys for communicating direction information and command selections to the processors 502a-c and for controlling cursor movement on the display device.

System 500 may also include a communication device (not shown), such as a modem, a network interface card, or other well-known interface devices, such as those used for coupling to Ethernet, token ring, or other types of physical attachment for purposes of providing a communication link to support a local or wide area network, for example. Stated differently, the system 500 may be coupled with a number of clients and/or servers via a conventional network infrastructure, such as a company's intranet and/or the Internet, for example.

It is appreciated that a lesser or more equipped system than the example described above may be desirable for certain implementations. Therefore, the configuration of system 500 may vary from implementation to implementation depending upon numerous factors, such as price constraints, performance requirements, technological improvements, and/or other circumstances.

It should be noted that, while the embodiments described herein may be performed under the control of a programmed processor, such as processors 502a-c, in alternative embodiments, the embodiments may be fully or partially implemented by any programmable or hardcoded logic, such as field programmable gate arrays (FPGAs), transistor transistor logic (TTL) logic, or application specific integrated circuits (ASICs). Additionally, the embodiments of the invention may be performed by any combination of programmed general-purpose computer components and/or custom hardware components. Therefore, nothing disclosed herein should be construed as limiting the various embodiments of the invention to a particular embodiment wherein the recited embodiments may be performed by a specific combination of hardware components.

In the above description, numerous specific details such as logic implementations, opcodes, resource partitioning, resource sharing, and resource duplication implementations, types and interrelationships of system components, and logic partitioning/integration choices may be set forth in order to provide a more thorough understanding of various embodiments of the invention. It will be appreciated, however, to one skilled in the art that the embodiments of the invention may be practiced without such specific details, based on the disclosure provided. In other instances, control structures, gate level circuits and full software instruction sequences have not been shown in detail in order not to obscure the invention. Those of ordinary skill in the art, with the included descriptions, will be able to implement appropriate functionality without undue experimentation.

The various embodiments of the invention set forth above may be performed by hardware components or may be embodied in machine-executable instructions, which may be used to cause a general-purpose or special-purpose processor or a machine or logic circuits programmed with the instructions to perform the various embodiments. Alternatively, the various embodiments may be performed by a combination of hardware and software.

Various embodiments of the invention may be provided as a computer program product, which may include a machine-readable medium having stored thereon instructions, which may be used to program a computer (or other electronic devices) to perform a process according to various embodiments of the invention, The machine-readable medium may include, but is not limited to, floppy diskette, optical disk, compact disk-read-only memory (CD-ROM), magneto-optical disk, read-only memory (ROM) random access memory (RAM), erasable programmable read-only memory (EPROM), electrically erasable programmable read-only memory (EEPROM), magnetic or optical card, flash memory, or another type of media/machine-readable medium suitable for storing electronic instructions. Moreover, various embodiments of the invention may also be downloaded as a computer program product, wherein the program may be transferred from a remote computer to a requesting computer by way of data signals embodied in propagation medium via a communication link (e.g., a modem or network connection).

Similarly, it should be appreciated that in the foregoing description, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Whereas many alterations and modifications of the invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A method, comprising:
   generating a population of chromosomes, each chromosome including one or more elements that indicate a cluster to which a portion of microcode memory belongs;
   determining a fitness value of each chromosome, where the fitness value is a function of a number of columns in the microcode memory, a number of bits in each column, a number of clusters that the columns in the microcode memory are clustered into, a number of columns in each cluster, and a number of unique patterns in each cluster;
   modifying the population of chromosomes based on the fitness values of the chromosomes to generate a new population of chromosomes; and
   compressing the microcode memory using a cluster-based compression technique, wherein clusters are selected according to a chromosome from the new population with the best fitness.

2. The method of claim 1, wherein modifying the population of chromosomes further comprises:
   selecting a chromosome with the highest fitness value of the population to keep in the new population of chromosomes;
   removing one or more chromosome having a fitness value in the lower half of the fitness values of the population;
   crossing-over one or more pairs of chromosomes to produce permutations of the chromosomes; and
   mutating one or more chromosomes to produce new chromosomes.

3. The method of claim 2, wherein mutating one or more chromosomes further comprises changing the value of each element in the one or more chromosomes with a first probability for chromosomes with a fitness value in the top half of the fitness values of the population and a second probability that is higher than the first probability for chromosomes with a fitness value in the bottom half of the fitness values of the population.

4. The method of claim 3, wherein the first probability is 5% and the second probability is 10%.

5. The method of claim 1, wherein determining a fitness value and modifying the population are repeated to improve the fitness values of the chromosomes.

6. The method of claim 1, wherein determining a fitness value and modifying the population are repeated until a chromosome with a fitness value exceeding a threshold fitness value is found.

7. The method of claim 5, wherein determining the fitness value further comprises applying an objective function to each chromosome that identifies the microcode storage saved by each chromosome.

8. The method of claim 1, wherein the microcode storage is microcode read only memory (UROM).

9. The method of claim 1, wherein the chromosome is a data structure including a string of bits.

10. A machine-accessible medium having stored thereon data representing sets of instructions that, when executed by a machine, cause the machine to perform operations comprising:
- generating a first population of chromosomes, each chromosome including one or more elements that indicate a cluster to which a portion of microcode memory is assigned;
- determining a fitness value of each chromosome, where the fitness value is a function of a number of columns in the microcode memory, a number of bits in each column, a number of clusters that the columns in the microcode memory are clustered into, a number of columns in each cluster, and a number of unique patterns in each cluster;
- generating a second population of chromosomes by modifying the first population of chromosomes based on the fitness values of the first population of chromosomes; and
- compressing the microcode memory using a cluster-based compression technique, wherein clusters are selected according to a chromosome from the second population with the best fitness value.

11. The machine-accessible medium of claim 10, wherein generating the second population of chromosomes further comprises:
- selecting a chromosome from the first population with the highest fitness value of fitness values of the first population to include in the second population;
- excluding from the second population one or more chromosome having a fitness value in the lower half of the fitness values of the first population;
- crossing-over one or more pairs of chromosomes from the first population to produce permutations of the one or more pairs of chromosomes to include in the second population; and
- mutating one or more chromosomes to produce new chromosomes to include in the second population.

12. The machine-accessible medium of claim 11, wherein mutating one or more chromosomes further comprises changing the value of each element in the one or more chromosomes with a first probability for chromosomes with a fitness value in the top half of the fitness values of the first population and a second probability that is higher than the first probability for chromosomes with a fitness value in the bottom half of the fitness values of the first population.

13. The machine-accessible medium of claim 10, wherein determining a fitness value further comprises applying an objective function to each chromosome that identifies microcode storage saved by each chromosome.

14. The machine-accessible medium of claim 10, wherein the microcode storage is microcode read only memory (UROM).

15. The machine-accessible medium of claim 10, wherein determining a fitness value and generating a second population are repeated to improve the fitness values.

16. A system, comprising:
- a microcode read only memory (UROM); and
- a processor coupled with the UROM memory, the processor to:
  - generate a population of chromosomes, each chromosome including one or more elements that indicate a cluster to which a portion of microcode memory belongs;
  - determine a fitness value of each chromosome, where the fitness value is a function of a number of columns in the microcode memory, a number of bits in each column, a number of clusters that the columns in the microcode memory are clustered into, a number of columns in each cluster, and a number of unique patterns in each cluster;
  - modify the population of chromosomes based on the fitness values of the chromosomes to generate a new population of chromosomes; and
  - compress the microcode memory using a cluster-based compression technique, wherein clusters are selected according to a chromosome from the new population with the best fitness value.

17. The system of claim 16, wherein modifying the population of chromosomes further comprises:
- selecting a chromosome with the highest fitness value of the fitness values of the population to keep in the new population;
- removing one or more chromosomes having fitness values in the lower half of the fitness values of the population;
- crossing-over one or more pairs of chromosomes to produce permutations of the chromosomes; and
- mutating one or more chromosomes to produce new chromosomes.

18. The system of claim 17, wherein mutating one or more chromosomes further comprises changing the value of each element in the one or more chromosomes with a first probability for chromosomes with a fitness value in the top half of the fitness values of the population and a second probability that is higher than the first probability for chromosomes with a fitness value in the bottom half of the fitness values of the population.

19. The system of claim 16, wherein determining the fitness value and modifying the population are repeated until a chromosome with a fitness value exceeding a threshold fitness value is found.

20. The system of claim 16, wherein the chromosome is a data structure including a string of bits.

* * * * *